United States Patent
McNutt

(10) Patent No.: US 7,134,118 B1
(45) Date of Patent: Nov. 7, 2006

(54) RE-PROGRAMMABLE FLASH MEMORY MICRO CONTROLLER AS PROGRAMMABLE LOGIC CONTROLLER

(75) Inventor: Alan McNutt, Johnson City, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 418 days.

(21) Appl. No.: 09/697,419

(22) Filed: Oct. 26, 2000

(51) Int. Cl.
*G06F 9/45* (2006.01)

(52) U.S. Cl. .................................. 717/138
(58) Field of Classification Search ........ 717/140–167, 717/168–178; 700/18–19, 278; 703/13; 711/103, 171; 712/38; 710/1
See application file for complete search history.

(56) References Cited

U.S. PATENT DOCUMENTS

| | | | | |
|---|---|---|---|---|
| 4,485,455 A | * | 11/1984 | Boone et al. ............... | 708/130 |
| 4,527,247 A | * | 7/1985 | Kaiser et al. .............. | 700/278 |
| 4,969,083 A | * | 11/1990 | Gates ......................... | 700/18 |
| 5,179,716 A | * | 1/1993 | Agrawal et al. ............. | 712/38 |
| 5,195,130 A | * | 3/1993 | Weiss et al. ............. | 379/93.19 |
| 5,287,548 A | * | 2/1994 | Flood et al. ................. | 700/18 |
| 5,495,593 A | | 2/1996 | Elmer et al. ................ | 395/430 |
| 5,519,843 A | * | 5/1996 | Moran et al. ............... | 711/103 |
| 5,566,344 A | | 10/1996 | Hall et al. .................. | 395/800 |
| 5,590,373 A | | 12/1996 | Whitley et al. ............. | 395/828 |
| 5,802,389 A | * | 9/1998 | McNutt ....................... | 710/1 |
| 5,964,890 A | | 10/1999 | Inui et al. .................... | 714/28 |
| 5,978,943 A | * | 11/1999 | Narukawa ................... | 714/725 |
| 6,026,230 A | * | 2/2000 | Lin et al. ....................... | 703/13 |
| 6,052,755 A | * | 4/2000 | Terrill et al. ................ | 711/103 |
| 6,205,513 B1 | * | 3/2001 | Godicke et al. ............ | 711/103 |
| 6,249,711 B1 | * | 6/2001 | Aart ............................ | 700/19 |
| 6,263,487 B1 | * | 7/2001 | Stripf et al. ................ | 717/171 |
| 6,665,817 B1 | * | 12/2003 | Rieken ........................ | 714/30 |

FOREIGN PATENT DOCUMENTS

| | | |
|---|---|---|
| EP | 0 334 523 A2 | 9/1989 |
| EP | 0 578 361 A1 | 1/1994 |
| EP | 0 797 152 A1 | 9/1997 |

OTHER PUBLICATIONS

Webb et al., "Programmable Logic Controllers—Principles and Applications", 3rd Ed., Prentice Hall, 1995, ISBN: 0024249807, ch. 2, 3, 18, 24.*
Flash EPROM controller SAB 88C166 sets new standards for real-time applications; Thomas Staudinger; Siemens Components, Siemens-AG Semiconductor Group; Sep. 1993 No. 4.
Intel XP-002188114—80C51FA/83C51FA "Event Control CHMOS Single-Chip 8-Bit Microcontroller"; pp. 1-13, Feb. 1995.
A Prototype for an Integrated Energy Automation System; School of Electrical and Electronic Engineering, pp. 1811-1818, 5/90/00.
International Search Report, Int'l. Application No. PCT/US 00/29639, File No. 99P7938P.

* cited by examiner

*Primary Examiner*—Kakali Chaki
*Assistant Examiner*—Tuan Anh Vu

(57) ABSTRACT

Functions of a programmable logic controller are located in physically separable units. These physically separable units include a program execution device, or control device, whose function is limited to sequencing through the user logic program and a communication/programming device, which provides the programmability function. The micro controller incorporates a micro processor, RAM, and a re-programmable Flash EPROM in a single package implements the logical core of the program execution device.

8 Claims, 1 Drawing Sheet

RE-PROGRAMMABLE FLASH MEMORY MICRO CONTROLLER AS PROGRAMMABLE LOGIC CONTROLLER

BACKGROUND

1. Field of the Invention

The present invention relates to a flash memory and, more particularly, to a re-programmable flash memory micro controller. The flash memory may be configured as a programmable logic controller.

2. Related Information

Programmable logic controllers on the market today generally have a common architecture. Typically, the controller CPU includes a microprocessor, possibly supplemented with a custom control instruction processor (boolean processor), for execution of the user program under the supervision of an operating system, random access data memory (RAM) for user and operating system data, battery backed RAM or non-volatile EEPROM for storing the user program, and a permanent ROM or EPROM for storage of the operating system software.

The user program is typically prepared on a general purpose computer and loaded into the PLC in symbolic form. The loading is typically by means of a serial communications protocol, though a removable memory cartridge may sometimes be used to by-pass this step. Within the PLC, the symbolic code is converted to executable code by a compiler. Included in the system software that must be permanently stored in ROM, there is the actual operating system that coordinates execution, the communications software to support transfer of the user program and data, and the compiler which converts the symbolic user program to executable form.

The operating system has to coordinate the communications, compilation, and program execution functions. This requires some sophistication of the operating system to respond to communications events, queue/de queue deferred tasks, and manage mode transitions between program mode and run mode. The compiler and communications software functions may be quite large, and significantly extend permanent storage requirements beyond that needed for controlling the execution of the user program.

Recently introduced models designed for low cost have used micro controllers including the data RAM and operating system ROM on a single chip with the microprocessor. The user program is contained in an external storage device: battery backed RAM, EPROM, or EEPROM, possibly added to the basic unit as a removable memory cartridge.

OBJECTS AND SUMMARY OF THE INVENTION

It is an object of the present invention to provide a memory that resolves the aforementioned problems. In this invention the functions of the programmable logic controller are located in physically separable units. These physically separable units include a program execution device, or control device, whose function is limited to sequencing through the user logic program and a communication/programming device, which provides the programmability function.

A micro controller incorporating a micro processor, RAM, and re-programmable Flash EPROM in a single package implements the logical core of the program execution device. The external pins of this package can be largely devoted to the I/O functions of the programmed control task, and do not need to be utilized for access of external memory devices by the micro processor. External memory devices, data/address busses, buffers, etc. are eliminated from the architecture, reducing size and cost of the control function.

The communication/programming device provides in a separable package all functions required for external communication and conversion of the user program from symbolic form to binary code, and loading of that code into the program execution device. This binary code is programmed into the re-programmable memory of the program execution device by direct manipulation of the logic controls of the re-programmable memory. These controls are carried via dual use pins on the micro controller, which are used for the main mission I/O function of the controller when the user program is executing.

Instead of having a distinct operating system, the binary code loaded into the micro controller includes a compilation of the symbolic user control program with a system support kernel. The kernel provides support for time base functions seen as services by the user, watchdog timer maintenance, and re-starting of the user program after each completion of the user program sequence.

The block diagram below shows the extreme simplicity of the program execution device. This diagram shows, as non-essential auxiliary features, a watchdog timer function to disable outputs on controller failure and optical isolation of inputs and outputs. The communication/programming device consists of a micro processor or micro controller, together with sufficient RAM and ROM to handle the given tasks, a communications port useable by a general purpose computer, and controlled lines to a programming port which can program the ROM of the program execution device.

The advantage of this invention is that it minimizes components required to implement the most often used portion of a programmable logic controller, thus leading to lower cost. The burden of communications and compilation firmware and storage hardware, which is required only for program development, is excluded from the program execution device. The communication and program compilation tools are included in a separate programming device, by which the user may make use of a single instance of the programming device to program a potentially very large number of program execution devices.

In existing programmable logic controllers, these included functions of communication and compilation typically consume tens of thousands of bytes of stored binary code. Removing these functions from the program execution device represents a significant saving in hardware for controllers that are designed for user programs of only a few hundreds of bytes.

DETAILED DESCRIPTION OF THE PREFERRED EMBODIMENTS

Figure 1:
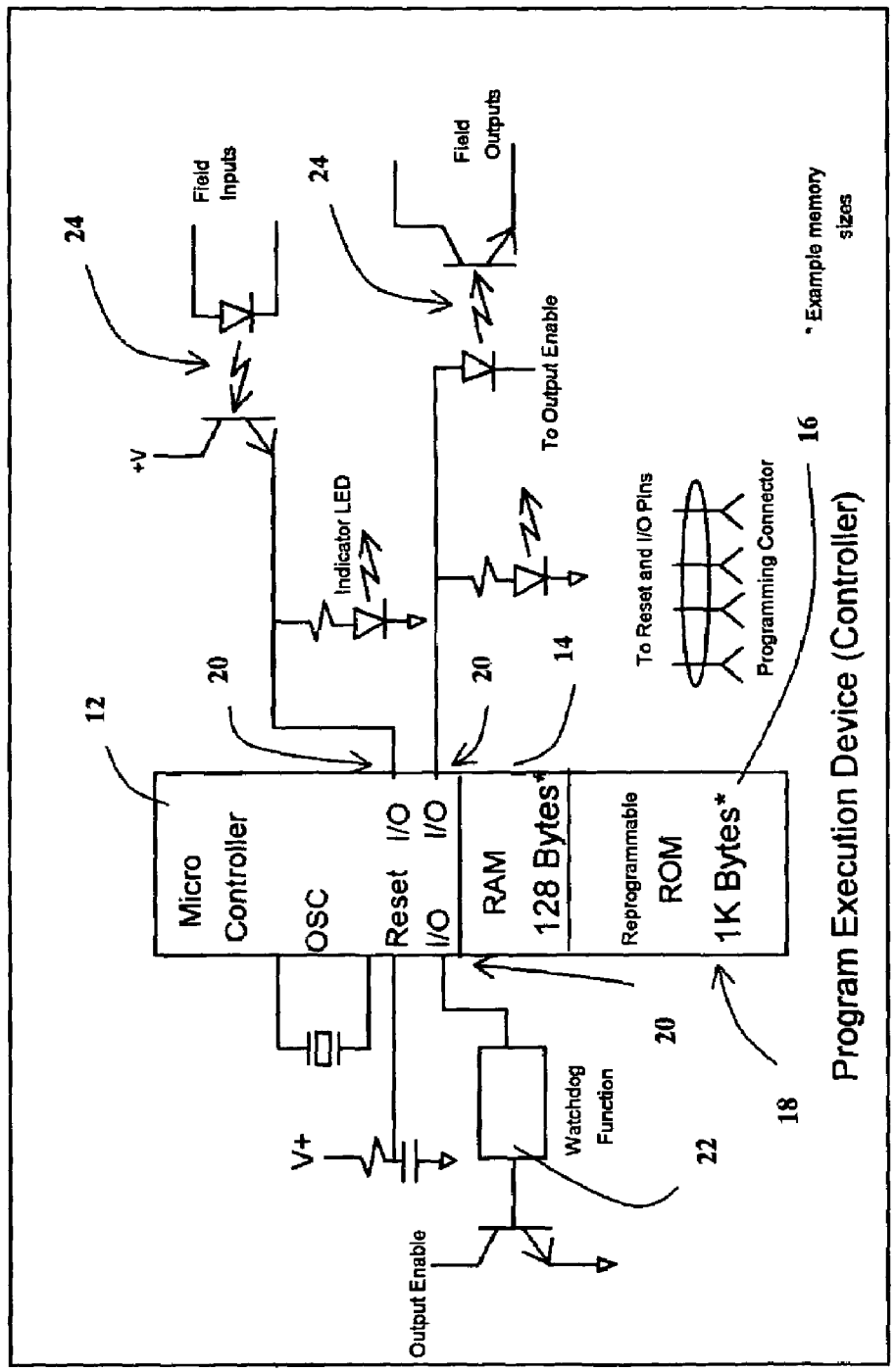
FIG. 1 shows the invention.

In this invention the functions of the programmable logic controller are located in physically separable units. These physically separable units include a program execution device, or control device, whose function is limited to sequencing through the user logic program and a communication/programming device, which provides the programmability function.

As shown in FIG. 1, a micro controller 10 incorporating a micro processor 12, RAM 14, and re-programmable Flash EPROM 16 in a single package 18 implements the logical core of the program execution device. The external pins 20 of this package can be largely devoted to the I/O functions of the programmed control task, and do not need to be utilized for access of external memory devices by the micro processor. External memory devices, data/address busses, buffers, etc. are eliminated from the architecture, reducing size and cost of the control function.

The communication/programming device provides in a separable package all functions required for external communication and conversion of the user program from symbolic form to binary code, and loading of that code into the program execution device. This binary code is programmed into the re-programmable memory of the program execution device by direct manipulation of the logic controls of the re-programmable memory. These controls are carried via dual use pins on the micro controller, which are used for the main mission I/O function of the controller when the user program is executing.

Instead of having a distinct operating system, the binary code loaded into the micro controller includes a compilation of the symbolic user control program with a system support kernel. The kernel provides support for time base functions seen as services by the user, watchdog timer maintenance, and re-starting of the user program after each completion of the user program sequence.

The diagram of FIG. 1 below shows the extreme simplicity, yet novel ingenuity, of the program execution device. This diagram shows, as non-essential auxiliary features, a watchdog timer 22 function to disable outputs on controller failure and optical isolation 24 of inputs and outputs. The communication/programming device consists of a micro processor or micro controller, together with sufficient RAM and ROM to handle the given tasks, a communications port useable by a general purpose computer, and controlled lines to a programming port which can program the ROM of the program execution device.

The advantage of this invention is that it minimizes components required to implement the most often used portion of a programmable logic controller, thus leading to lower cost. The burden of communications and compilation firmware and storage hardware, which is required only for program development, is excluded from the program execution device. The communication and program compilation tools are included in a separate programming device, by which the user may make use of a single instance of the programming device to program a potentially very large number of program execution devices.

In existing programmable logic controllers, these included functions of communication and compilation typically consume tens of thousands of bytes of stored binary code. Removing these functions from the program execution device represents a significant saving in hardware for controllers that are designed for user programs of only a few hundreds of bytes.

The invention claimed is:

1. An apparatus comprising:
a programmable logic controller lacking instructions to convert a user program from a symbolic form to a binary form, said programmable logic controller comprising:
 a single chip program execution device comprising:
  a micro controller operable to implement programmable logic controller I/O functions upon executing a compilation comprising the user program and a system support kernel, the system support kernel adapted to provide said programmable logic controller with operating system functions comprising sequencing the user program; and
  a re-programmable read only memory within which the compilation is stored,
said single chip program execution device separable from a communication/programming device adapted to convert the user program to a binary code module and combine the binary code module with the system support kernel into a single executable firmware module, said programmable logic controller lacking a memory device external to said single chip program execution device.

2. A method comprising:
receiving a symbolic user program at a communication/programming device, said communication/programming device separable from a single chip program execution device having a re-programmable read only memory, said single chip program execution device adapted to execute a binary programmable logic control program, said binary programmable logic control program stored within said re-programmable memory, said binary programmable logic control program adapted to operate a programmable logic controller, said programmable logic controller lacking a memory device external to said single chip program execution device; and
compiling, at said communication/programming device, said symbolic user program to a binary code module; and
combining the binary code module with a system support kernel to form said binary programmable logic control program, the system support kernel adapted to provide said programmable logic controller with operating system functions comprising sequencing the user program.

3. The method of claim 2 comprising:
providing said binary programmable logic control program to said single chip program execution device.

4. A method comprising:
receiving, from a communication/programming device, a binary programmable logic control program at a single chip program execution device having a re-programmable read only memory, said communication/programming device separable from said single chip program execution device, said binary programmable logic control program comprising a compilation of a symbolic user program combined with a system support kernel to form a single executable module, the system support kernel adapted to provide a programmable logic controller with operating system functions comprising sequencing the user program, said single chip program execution device adapted to execute said binary programmable logic control program to operate a programmable logic controller, said programmable logic controller lacking a memory device external to said single chip program execution device; and
loading said binary programmable logic control program into said re-programmable read only memory of said program single chip execution device.

5. The method of claim 4, further comprising:
executing said binary programmable logic control program on a micro controller of said single chip program execution device.

6. A programmable logic controller system, comprising:
within a single chip, a program execution device having a re-programmable memory, said program execution device adapted to execute a binary programmable logic control program, said binary programmable logic control program stored within said re-programmable memory, said binary programmable logic control program comprising a compilation of a user program and a system support kernel, said binary programmable logic control program adapted to operate a programmable logic controller, said programmable logic controller lacking a memory device external to said single chip program execution device; and a communication/programming device separable from said program execution device, said communication/programming device providing functions required for external communication of said binary programmable logic control program, said binary programmable logic control program comprising a binary module formed from compiling a symbolic user program, the binary module combined with a system support kernel to form a single executable module, the system support kernel adapted to provide said programmable logic controller with operating system functions comprising sequencing the user program, said communication/programming device adapted to load said binary programmable logic control program into said re-programmable memory and wherein said binary programmable logic control program is stored in said re-programmable memory of said program execution device by direct manipulation of logic controls of said re-programmable memory.

7. The programmable logic controller system according to claim 6, further comprising:

a watchdog timer.

8. A machine-readable medium storing instructions for activities comprising:

receiving a symbolic user program at a communication/programming device, said communication/programming device separable from a single chip program execution device having a re-programmable read only memory, said single chip program execution device adapted to execute a binary programmable logic control program, said binary programmable logic control program stored within said re-programmable memory, said binary programmable logic control program adapted to operate a programmable logic controller, said binary programmable logic control program comprising a binary module derived via compiling a symbolic user program, the binary module combined with a system support kernel to form a single executable module, the system support kernel adapted to provide said programmable logic controller with operating system functions comprising sequencing the user program, said programmable logic controller lacking a memory device external to said single chip program execution device; and compiling, at said communication/programming device, said symbolic user program with a system support kernel to form said binary programmable logic control program.

* * * * *